US010836914B2

(12) United States Patent
Ranganathan et al.

(10) Patent No.: US 10,836,914 B2
(45) Date of Patent: Nov. 17, 2020

(54) DURABLE COATING COMPOSITIONS AND COATINGS FORMED THEREOF

(71) Applicant: General Cable Technologies Corporation, Highland Heights, KY (US)

(72) Inventors: Sathish Kumar Ranganathan, Avon, IN (US); Srinivas Siripurapu, Carmel, IN (US); Vijay Mhetar, Conroe, TX (US)

(73) Assignee: General Cable Technologies Corporation, Highland Heights, KY (US)

( * ) Notice: Subject to any disclaimer, the term of this patent is extended or adjusted under 35 U.S.C. 154(b) by 122 days.

(21) Appl. No.: 15/789,630

(22) Filed: Oct. 20, 2017

(65) Prior Publication Data

US 2018/0112077 A1    Apr. 26, 2018

Related U.S. Application Data

(60) Provisional application No. 62/410,699, filed on Oct. 20, 2016.

(51) Int. Cl.

| | | |
|---|---|---|
| *C09D 1/04* | (2006.01) | |
| *C09D 5/00* | (2006.01) | |
| *C09D 183/04* | (2006.01) | |
| *H02G 7/16* | (2006.01) | |
| *C09D 7/62* | (2018.01) | |
| *C09D 183/10* | (2006.01) | |
| *C09D 5/16* | (2006.01) | |
| *C08G 77/458* | (2006.01) | |
| *C08G 77/442* | (2006.01) | |
| *C08K 3/22* | (2006.01) | |

(52) U.S. Cl.
CPC ............... *C09D 1/04* (2013.01); *C09D 5/00* (2013.01); *C09D 5/1612* (2013.01); *C09D 5/1618* (2013.01); *C09D 5/1675* (2013.01); *C09D 7/62* (2018.01); *C09D 183/04* (2013.01); *C09D 183/10* (2013.01); *H02G 7/16* (2013.01); *C08G 77/442* (2013.01); *C08G 77/458* (2013.01); *C08K 2003/2227* (2013.01)

(58) Field of Classification Search
CPC .......... C09D 1/04; C09D 183/10; C09D 5/00; C09D 183/04; C09D 7/62; C09D 5/1612; C09D 5/1675; C09D 5/1618; H02G 7/16; C08G 77/458; C08G 77/442; C08K 2003/2227
See application file for complete search history.

(56) References Cited

U.S. PATENT DOCUMENTS

| | | | |
|---|---|---|---|
| 7,015,395 B2 | 3/2006 | Goldsworthy et al. | |
| 7,438,971 B2 | 10/2008 | Bryant et al. | |
| 7,752,754 B2 | 7/2010 | Goldsworthy et al. | |
| 9,328,245 B2 | 5/2016 | Siripurapu et al. | |
| 2002/0034650 A1 | 3/2002 | Neely, Jr. | |
| 2003/0071241 A1 | 4/2003 | Chon et al. | |
| 2003/0185990 A1 | 10/2003 | Bittner et al. | |
| 2004/0022951 A1 | 2/2004 | Maurus | |
| 2005/0031790 A1* | 2/2005 | Jackson | C09D 1/02 427/372.2 |
| 2006/0003175 A1 | 1/2006 | Kanega et al. | |
| 2010/0009280 A1 | 1/2010 | Liu et al. | |
| 2010/0119850 A1 | 5/2010 | Browne et al. | |
| 2014/0041925 A1* | 2/2014 | Davis | H01B 7/29 174/40 R |
| 2014/0141262 A1 | 5/2014 | Castle et al. | |
| 2014/0205804 A1 | 7/2014 | Jones et al. | |
| 2015/0104641 A1 | 4/2015 | Mhetar et al. | |
| 2015/0353737 A1 | 12/2015 | Siripurapu et al. | |
| 2015/0361319 A1 | 12/2015 | Gao | |
| 2015/0368496 A1 | 12/2015 | Hawig | |
| 2016/0042837 A1 | 2/2016 | Ranganathan et al. | |
| 2016/0083862 A1 | 3/2016 | Malshe et al. | |
| 2017/0321077 A1 | 11/2017 | Ranganathan et al. | |

FOREIGN PATENT DOCUMENTS

| | | |
|---|---|---|
| CN | 102977700 A | 3/2013 |
| WO | 2015119943 A1 | 8/2015 |
| WO | 2018/081564 A1 | 5/2018 |

OTHER PUBLICATIONS

Ahmed, Sheeba; Non-Final Office Action issued in U.S. Appl. No. 15/789,639; dated Oct. 4, 2018; 7 pages.
Ahmed, Sheeba; Notice of Allowance and Fee(s) Due, issued in U.S. Appl. No. 15/789,639; dated Feb. 27, 2019; 7 pages.
Young, Lee W.; International Search Report and Written Opinion of the International Searching Authority, issued in International Application No. PCT/US2017/057671; dated Jan. 10, 2018; 9 pages.
Young, Lee W.; International Search Report and Written Opinion of the International Searching Authority, issued in International Application No. PCT/US2017/057675; dated Jan. 5, 2018; 8 pages.
Farzaneh, Masoud et al.; Coatings for Protecting Overhead Power Network Equipment in Winter Conditions; CIGRE; Sep. 2015; 116 pages.
Dotan, Ana, et al.; Abstract of article, "The Relationship between Water Wetting and Ice Adhesion"; in Journal of Adhesion Science and Technology 23(15); Sep. 2009; 1 page.

(Continued)

*Primary Examiner* — Jonathan C Langman
(74) *Attorney, Agent, or Firm* — Ulmer & Berne LLP

(57) ABSTRACT

A durable coating composition includes a silicate binder, a filler, and a crosslinking agent. The coating composition can reduce ice adherence and minimize ice accumulation through inclusion of a film forming lubricant. Articles and overhead conductors coated with such coating compositions are also disclosed.

17 Claims, No Drawings

(56) References Cited

OTHER PUBLICATIONS

Bharathidasan T. et al.; Effect of wettability and surface roughness on ice-adhesion strength of hydrophilic, hydrophobic and superhydrophobic surfaces; Applied Surface Science, vol. 314; Jun. 21, 2014; pp. 241-250.
Ranganathan et al.; U.S. Appl. No. 15/789,639; Title: Durable Coating Compositions and Coatings Formed Thereof; filed Oct. 20, 2017.
Villar Lopez, Viviana Maria; Expert Report issued in Chilean Patent Application No. 201901071; dated Feb. 10, 2020; 27 pages, including English translation.
Villar Lopez, Viviana Maria; Office Action issued in Chilean Patent Application No. 201901071; dated Jun. 15, 2020; 26 pages, including partial machine translation.
Siemsen, Beatrice; Extended European Search Report, including the supplementary European search report and the European search opinion, issued in European Patent Application No. 17862474.8; dated May 11, 2020; 7 pages.

* cited by examiner

DURABLE COATING COMPOSITIONS AND COATINGS FORMED THEREOF

REFERENCE TO RELATED APPLICATIONS

The present application claims the priority benefit of U.S. provisional application Ser. No. 62/410,699, entitled DURABLE COATING COMPOSITIONS AND COATINGS FORMED THEREOF, filed Oct. 20, 2016, and hereby incorporates the same application herein by reference in its entirety.

TECHNICAL FIELD

The present disclosure generally relates to durable coating compositions as well as to coating compositions that reduce ice adherence and minimize ice accumulation.

BACKGROUND

Coatings formed from coating compositions including silicate binders can exhibit a variety of useful properties making such coatings particularly suitable for overhead conductors and other related articles, including power transmission line accessories. For example, coatings formed from such coating compositions can exhibit high durability, long lifespans, and resistance to corona, corrosion, and dust. Additionally, such coatings can exhibit high thermal emissivity which can allow overhead conductors and power transmission line accessories to operate at lower temperatures. However, known compositions including silicate binders require high temperatures to cure limiting the usefulness of the compositions.

The accumulation and buildup of ice on exposed power transmission equipment such as overhead conductors can also cause a number of detrimental issues. For example, ice accumulation on overhead conductors can cause weight and load bearing issues due to the weight of the ice, increased wind loadings from enlarged cross-sectional areas, and hazards from falling ice. Similar issues can also occur when ice accumulates on aerospace equipment, automotive equipment, telecommunications equipment, construction equipment, and other commercial equipment. To prevent, or minimize, such detrimental issues, it is known to de-ice exposed equipment through techniques such as heating and mechanical ice removal. Such techniques are disadvantageous however because they are time intensive and remove ice only after accumulation occurs.

It would therefore be advantageous to offer improved coating compositions which can be cured under ambient conditions and which can be modified to reduce ice adherence and preemptively minimize ice accumulation.

SUMMARY

In accordance with one embodiment, a coating composition includes a silicate binder, a filler, a coating modifier, and a crosslinking agent. The coating modifier includes one or more of a dispersion agent and an adhesion promotor. The crosslinking agent includes a multi-metal complex.

In accordance with another embodiment, a coating composition includes a silicate binder, a filler, a crosslinking agent, and a film forming lubricant.

DETAILED DESCRIPTION

As will be described herein, coating compositions are disclosed which can form durable and flexible coatings on articles such as overhead conductors, power and energy equipment, aerospace equipment, automotive equipment, heat pumps, refrigerators, telecommunication equipment, construction equipment, and maritime equipment. The coating compositions can be applied as a liquid and can be cured under ambient conditions. In certain embodiments, the coating compositions can be modified to reduce ice adherence and ice accumulation on articles when such articles are coated with the coating composition. In such embodiments, the coating compositions are particularly suited to reduce ice adherence and ice accumulation on overhead conductors and power distribution equipment. Generally, the described coating compositions can include a silicate binder, a filler, and a crosslinking agent. The coating compositions can be modified to reduce ice adherence and ice accumulation through incorporation of a film forming lubricant.

As can be appreciated, the use of a silicate binder can allow the coating compositions described herein to form durable coatings on articles. For example, U.S. Patent App. Pub. No. 2015/0353737 and U.S. Pat. No. 9,328,245, each incorporated herein by reference, describe flexible and durable coatings for overhead conductors and transmission line accessories which are formed from compositions including silicate binders. Advantageously, the coating compositions described herein can cure under ambient conditions further improving the utility of compositions formed with a silicate binder. Additionally, it has been discovered that the inclusion of film forming lubricants to coating compositions described herein can allow coatings formed from such compositions to further exhibit reduced ice adherence and ice accumulation.

According to certain embodiments, suitable silicate binders for the coating compositions described herein can be selected from certain silicates, such as alkali metal silicates. Suitable alkali metal silicate binders can include potassium silicate, sodium silicate, lithium silicate, and calcium silicate. In certain embodiments, it can be advantageous for the silicate binder to be a water soluble alkali metal silicate such as potassium silicate to facilitate the formation of a liquid coating composition. Suitable alkali metal silicate binders can have a metal oxide to silica ratio of about 1:1 to about 1:6 in certain embodiments, or a ratio of about 1:2 to about 1:4 in certain embodiments. In certain embodiments, a suitable silicate binder can alternatively be aqueous colloidal silica. Coating compositions can include a silicate binder at about 15% to about 60%, by dry weight, in certain embodiments, at about 20% to about 55%, by dry weight, in certain embodiments, and at about 25% to about 45%, by dry weight, in certain embodiments.

A crosslinking agent can be included in the described compositions to facilitate curing of the silicate binder. For example, it has been discovered that certain multi-metal complexes can crosslink silicate binders. As used herein, multi-metal complexes means two or more metals in complex form including, for example, calcium zinc and molybdate complexes, zinc molybdate and magnesium silicate complexes, zinc phosphate and metal silicate complexes, zinc phosphate and zinc oxide complexes, and zinc molybdate and magnesium hydroxide complexes. Multi-metal complexes can advantageously provide suitable crosslinking of alkali metal silicate binders under ambient conditions. As used herein, ambient conditions can mean in an environment having a temperature of about 15° C. to about 40° C. in certain embodiments, about 20° C. to about 35° C. in certain embodiments, and about 25° C. to about 30° C. in certain embodiments. An environment at suitable ambient conditions can further mean having a relative humidity of about 40% to about 95% in certain embodiments, about 50% to about 90% in certain embodiments, and about 60% to about 80% in certain embodiments. In certain embodiments including a multi-metal complex, it can be advantageous to include additional curing agents. For example, a metal oxide such as zinc oxide can provide an additional curing effect.

As can be appreciated, suitable multi-metal complexes can be commercially obtained. For example, a suitable commercially supplied zinc molybdate and magnesium silicate complex is Kemgard® 911C marketed by the J.M. Huber Corp. of Atlanta, Ga.

In certain embodiments, a metal oxide or metal hydroxide crosslinking agent can additionally, or alternatively, be included to provide curing of a coating composition. Suitable metal oxide and metal hydroxide crosslinking agents can include magnesium compounds such as one or more of magnesium hydroxide and magnesium oxide. Magnesium hydroxide and magnesium oxide can advantageously be used either alone or together in certain embodiments to provide suitable curing to a coating composition.

Generally, the described coating compositions can include a crosslinking agent at about 3% to about 40%, by dry weight, in certain embodiments, about 5% to about 30%, by dry weight, in certain embodiments, and about 10% to about 22%, by dry weight, in certain embodiments.

The described coating compositions can include filler to influence the mechanical and electrical properties of the coatings. For example, filler can modify the viscosity of a coating composition and can improve the durability and scratch resistance of coatings formed from the compositions. Additionally, certain fillers, including at least metal nitride and metal carbide fillers, can increase the emissivity of coatings formed from the described compositions. As used herein, improved emissivity indicates that the coating increases the amount of heat radiated away from an underlying substrate. Generally any filler known in the cabling industry can be suitable for the coating compositions including quartz, aluminum oxide, mica, calcined kaolin, wollastonite, calcite, zirconia, zircon, micaceous iron oxide, iron oxide, aluminum silicates, talc (sometimes referred to as hydrated magnesium silicate), barium sulfate, lithopone, gallium oxide, cerium oxide, zirconium oxide, silicon hexaboride, carbon tetraboride, silicon tetraboride, silicon carbide, molybdenum disilicide, tungsten disilicide, zirconium diboride, zinc oxide, cupric chromite, magnesium oxide, silicon dioxide, chromium oxides, iron oxide, boron carbide, boron silicide, copper chromium oxide, titanium dioxide, aluminum nitride, boron nitride, alumina, and combinations thereof. Particularly advantageous fillers can include talc, calcined kaolin, aluminum oxide, and quartz. As can be appreciated, certain fillers can also exhibit other beneficial effects. For example, certain fillers such as zinc oxide can additionally, or synergistically, facilitate crosslinking of an alkali metal silicate binder. It can be beneficial for the described coating compositions to include such synergistic fillers.

In certain embodiments, suitable fillers can have an average particle size of about 50 microns or less, in certain embodiments, about 20 microns or less, and in certain embodiments, about 5 microns or less. In certain embodiments, suitable fillers can also, or alternatively, be nano sized fillers. For example, in certain embodiments, suitable fillers can have an average particle size of about 1 micron or less, in certain embodiments, about 500 nanometers or less, and in certain embodiments, about 250 nanometers or less. The total amount of filler in a composition can be about 30% to about 90%, by dry weight, of the coating composition, about 40% to about 80%, by dry weight of the coating composition, and about 50% to about 70%, by dry weight, of the coating composition.

The components of the coating compositions described herein can be dispersed in a liquid carrier. Although the liquid carrier is usually water, organic dispersants can also be suitable. For example, alcohols, ketones, esters, hydrocarbons, and combinations thereof can each be suitable as an organic dispersant. As can be appreciated, a mixture of water and water miscible organic dispersants can also be suitable. When dispersed in a liquid carrier, the total solids content of a coating composition can vary from about 20% to about 80% in certain embodiments, about 30% to about 70% in certain embodiments, about 35% to about 60% in certain embodiments, and about 40% to about 50% in certain embodiments. In certain embodiments, the coating compositions can be provided as a liquid composition including all components dispersed together in a liquid carrier.

In certain embodiments, the coating compositions described herein can be substantially free of any organic components including organic dispersants and organic solvents. As used herein, substantially free of any organic compounds means essentially free of organic compounds except as otherwise incidentally incorporated as minor components. In other embodiments, the coating compositions can include organic components. For example, in certain embodiments, a coating composition can include about 10% or less, organic components.

As can be appreciated, it can be particularly advantageous to apply the described coating compositions to articles, such as overhead conductors, which generate heat as coatings formed from the coating compositions can increase the emittance of heat away from the article. As illustration, the operating temperature of an overhead conductor is determined by the cumulative effect of heating and cooling on the cable including heat generated through conductor resistance losses, heat absorbed from external sources, and heat emitted away from the cable through conduction, convection, and radiation. The described compositions, when including heat emissive filler, can enable an overhead conductor coated with the cured composition to operate cooler than a similar uncoated overhead conductor by increasing the amount of heat emitted away from the cable. In certain embodiments, an overhead conductor coated with a described coating composition can operate about 5° C. or cooler when tested in accordance to ANSI C119.4-2004, than a similar uncoated overhead conductor. In certain embodiments, an overhead conductor coated with a described coating composition can operate about 10° C. or cooler when tested in accordance to ANSI C119.4-2004, than a similar uncoated overhead conductor.

To reduce ice adherence and the accumulation of ice on desired articles substantially coated with the coating composition, it has been discovered that a film forming lubricant can be added to the described coating compositions. Film forming lubricants impart high lubricity and low friction to the resultant coatings which reduces ice adherence. Coatings formed from coating compositions which include a film forming lubricant can exhibit reduced ice adherence strength when compared to similar coatings formed without the film forming lubricant. For example, in certain embodiments, the ice adherence strength of a coating can be reduced by about 30% or more, and in certain embodiments, by about 50% or more when a film forming lubricant is included when compared to similar coatings without the film forming lubricant. The ice adherence strength can be determined through the Ice Adherence Method described herein. As can be appreciated, low ice adherence strength can also reduce the accumulation of ice on an article. In certain embodiments, film forming lubricants can also impart additional effects to the described coating compositions. For example, a film forming lubricant can also increase the rate of drying and curing in certain embodiments.

Suitable film forming lubricants for the coating compositions can include film forming silicone polymers and fluoropolymers that have high lubricity. In certain embodiments, film forming lubricants can also be free of reactive groups. Examples of suitable film forming lubricants can include cyclosilicone, polysiloxane resin modifiers, polydimethylsiloxane, silane monomers, silane oligomers, silicone lubricants, and fluorinated ethylene-propylene ("FEP"). In certain embodiments, suitable film forming lubricants can be an emulsion including less than about 75% solids and having a viscosity greater than about 10 cST. For instance, epoxy silane and octamethylcyclotetrasiloxane are suitable film forming lubricants when included in an emulsion having less than 75% solids and having a viscosity greater than 10 cST.

As can be appreciated, certain silane compounds do not act as film forming lubricants. For instance, a liquid composition of methoxy silane having a solids content of greater than 90% and a viscosity of less than 10 cST does not act as a film forming lubricant but can rather act as a filler surface modifier or as a coating adhesion promotor. Differences which may indicate whether a silane oligomer can act as a film forming lubricant can include differences in form (e.g., an emulsion vs. a liquid); viscosity (e.g., greater than 10 cST vs. less than 10 cST), and by its solids content (e.g., less than about 75% solids vs. greater than about 90% solids).

A coating composition can include about 0.5% to about 25%, by dry weight, of a film forming lubricant in certain embodiments, about 1% to about 20%, by dry weight, of a film forming lubricant in certain embodiments, about 2% to about 12%, by dry weight, of a film forming lubricant in certain embodiments, and about 3% to about 8%, by dry weight, of a film forming lubricant in certain embodiments.

As can be appreciated, the coating compositions described herein can additionally include other coating modifiers to further tailor the properties of the compositions and resultant coatings. For example, one or more lubricants, dispersion agents, defoaming agents, flexibilizers, adhesion promotors, heat and UV stabilizers, colorants and pigments, viscosity modifiers, wetting agents, film leveling agents, dispersion agents, and coalescing agents can be included to further modify the properties of the compositions and coatings. When included, such coating modifiers can generally constitute about 0.1% to about 20%, by dry weight, of the described coating compositions in certain embodiments, about 0.1% to about 10%, by dry weight of a coating composition in certain embodiments, about 0.5% to about 5%, by dry weight, of a coating composition in certain embodiments, and about 1% to about 2%, by dry weight, of a coating composition in certain embodiments.

Non-film forming lubricants or lubricating oils can be included, for example, to improve the processability of coating compositions by forming a microscopic dispersed phase within the composition. During processing, applied shear can separate the non-film forming lubricant phase from the coating composition. The non-film forming lubricant can then migrate to the die wall to gradually form a continuous coating layer to reduce the backpressure of processing equipment. Suitable non-film forming lubricants can generally be selected from any known non-film forming lubricants such as dimethicone, fluorodimethicone, and polydimethylsiloxane ("PDMS") oil. In certain embodiments, a non-film forming lubricant can be miscible with the coating composition. In certain embodiments, non-film forming lubricants cannot form a form a dry film. As can be appreciated, other silicone and fluoropolymer lubricants can also be suitable.

In certain embodiments, dispersion agents can be included in the described coating compositions to improve the separation of particles and compounds in the composition. Examples of suitable dispersants can include sodium salts of phosphoric acid esters and silanes including ethoxy silanes, methoxy silanes, hydroxy silanes, epoxy silanes, and amino silanes.

A defoaming agent can be included in certain embodiments to inhibit or retard the formation of foam when water is added to the coating composition. Suitable examples of defoamers can include silicon-based antifoam agents and non-silicon-based antifoam agents. In certain embodiments, a surfactant can also be used as a defoamer. Suitable surfactants include, but are not limited to, cationic, anionic, or non-ionic surfactants, as well as fatty acid salts.

A flexibilizer can be included to improve the flexibility of coatings formed from the coating compositions described herein. For example, relatively small quantities of ethylene terpolymer can be included in certain embodiments to act as a flexibilizer.

Adhesion promotors can be included in the described coating compositions to improve adhesion of the coating to an article. Generally, known adhesion promoters such as heat resistant primers, low molecular weight isocyanate dispersions, acidic oligomers, silane adhesion promotors (e.g., fluoro alkoxy silanes and fluoro epoxy silanes such as methoxy silane), and epoxy oligomers can be suitable adhesion promoters. For example, an ethylene acrylic acid dispersion or methoxy silane can be included as an adhesion promoter in certain embodiments. As can be appreciated, certain adhesion promotors can also be referred to as surface modifiers.

Stabilizers can be included in a coating composition to improve stability of coatings formed of the coating composition to UV, light, and heat. Stabilizers can also increase the lifespan of coatings. Suitable UV or light stabilizers can include benzotriazole-type, triazine-type UV absorbers, and hindered amine light stabilizers ("HALS") compounds. Suitable heat stabilizers can be selected from 4,6-bis (octylthiomethyl)-o-cresol dioctadecyl 3,3'-thiodipropionate; poly [[6-[(1,1,3,3-tetramethylbutyl)amino]-1,3,5-triazine-2,4-diyl][2,2,6,6-tetramethyl-4-piperidinyl)imino]-1,6-hexanediyl[(2,2,6,6-tetramethyl-4-piperidinyl)imino]]; benzenepropanoic acid; 3,5-bis(1,1-dimethyl-ethyl)-4-hydroxy-C7-C9 branched alkyl esters; and isotridecyl-3-(3,5-di-tert-butyl-4-hydroxyphenyl) propionate. According to certain embodiments, a suitable heat stabilizer can be 4,6-bis (octylthiomethyl)-o-cresol; dioctadecyl 3,3'-thiodipropionate and/or poly[[6-[(1,1,3,3-terramethylbutyl)amino]-1,3, 5-triazine-2,4-diyl][2,2,6,6-tetramethyl-4-piperidinyl) imino]-1,6-hexanediyl[(2,2,6,6-tetramethyl-4-piperidinyl) imino]].

As can be appreciated, any known colorant or pigment such as carbon black, cadmium red, iron blue and the like can also be optionally included in a coating composition to provide color to the resulting coatings.

In certain embodiments, viscosity modifiers, sometimes referred to as rheology modifiers, can be included to modify the rheological properties of the described coating compositions. Suitable viscosity modifiers can include anionic polyacrylate copolymers, hydrophobically modified anionic polyacrylate copolymers, hydrophobically modified ethoxylated urethanes, water, low volatile organic compound ("VOC") solvents, and vinylpyrrolidone copolymers.

Wetting agents can be included to lower the surface tension and improve the spreadability of the described coating compositions. Generally, any wetting agent known in the industry can be suitable including modified fatty alcohol ethoxylates, modified polyacrylate polymer, fatty acid modified polymers, and alkylpolyalkoxylate.

Film leveling agents can be included to reduce or minimize film defects in coatings such as crawling, fish-eyes, cratering and the like. Known film leveling agents can be included in the described coating compositions to minimize such defects. Examples of suitable film leveling agents can include dimethyl cyclohexyl phthalate, dibutyl sebacate, aqueous dispersions of oleochemical compounds, and polyethylene imine.

In certain embodiments, coalescent agents or thickeners can be added to improve the film forming characteristics of a coating composition. In such embodiments, generally any coalescent agent as known in the art can be included to improve film formation.

Coatings formed the coating compositions described herein can demonstrate excellent mechanical properties. For example, coatings formed from the coating compositions can pass a 5 inch Mandrel Bend Test both before and after heat aging.

As used herein, the Mandrel Bend Test refers to a flexibility test for coatings. In the Mandrel Bend Test, coated samples are bent around cylindrical mandrels of decreasing diameter and then observed for any visible cracks in the coating at each of the mandrel sizes. The presence of visible cracks indicates failure of the sample. A sample passes the Mandrel Bend Test when no visible cracks are observed for a defined mandrel size. The Mandrel Bend Test can also evaluate flexibility of the coating after heat, UV, and water aging. For example, a 0.5 inch Mandrel Bend Test refers to the diameter of the cylindrical mandrels being 0.5 inch.

In certain embodiments, coatings formed from the coating compositions can also pass a 2 inch Mandrel Bend Test or a 0.5 inch Mandrel Bend Test both before and after heat aging. Heat aged samples for the Mandrel Bend Test were aged in a 90° C. oven for 7 days or in a 200° C. oven for 7 days.

As can be appreciated, the described coatings can also exhibit additional properties. For example, the coatings can exhibit self-healing, self-cleaning, corrosion resistance, IR reflectance, emissivity, and dust resistance. Additionally, these properties can be maintained after heat, UV, and/or water aging.

When a film forming lubricant is included, coatings formed of the coating compositions described herein can also demonstrate excellent resistance to ice adherence and accumulation both before and after heat and water aging. For example, coatings formed from such coating compositions can demonstrate ice adherence values of about 350 kPa or less in certain embodiments; ice adherence values of about 250 kPa or less in certain embodiments; ice adherence values of about 200 kPa or less in certain embodiments; ice adherence values of about 180 kPa or less in certain embodiments; and ice adherence values of about 150 kPa or less in certain embodiments. Coating compositions without a film forming lubricant can exhibit ice adherence values greater than about 500 kPa. The coatings can retain such excellent ice adherence values after heat, water, and UV aging. For example, ice adherence values can increase by about 50% of less after heat aging for 30 days at 150° C., 200° C., 250° C., or 300° C. and after water aging at 90° C. for 7 days. In certain embodiments, ice adherence values can increase after such heat and water aging by about 100% or less.

Ice adherence values were evaluated herein using the Ice Adherence Test. The Ice Adherence Test determines ice adherence values by coating a 4" by 4" aluminum sheet with a coating composition and then forming a 3" diameter by a 2" tall cylinder of ice on the coated sheet. The ice adherence strength was the force required to remove the ice cylinder from the coated sheet using an Instron Tensile machine applying a shear force parallel to the coated sheet.

Ice adherence values can also be evaluated after heat aging in the Heat Aged Ice Adherence Test. For the Heat Aged Ice Adherence Test, the sample to be evaluated is heated to 200° C. for 30 days before being evaluated with the Ice Adherence Test. A sample is considered to pass the Heat Aged Ice Adherence Test when the heat aged sample retains greater than 50% of the benefits of the applied coating.

Coatings formed from coating compositions including a film forming lubricant can have a water contact angle of about 50° to about 150° in certain embodiments. In certain embodiments, the coating composition can have a water contact angle of about 80° to about 140°. As can be appreciated, although water contact angles of about 150° or greater are considered super hydrophobic, super hydrophobic contact angles do not necessarily reduce ice adherence or ice accumulation.

The coating compositions described herein can be produced in a high-speed disperser ("HSD"), ball mill, bead mill or other machine using techniques known in the art. In certain embodiments, a HSD can be used to make the coating composition by slowly added together and mixing each of the components together until the desired dispersion of the components is achieved. In certain embodiments, the mixer speed can be about 10 revolutions per minute ("RPM") or more to achieve the desired coating composition.

Once the coating composition is prepared, it can be applied to a substrate to provide the substrate with a durable coating. Generally, any type of substrate can be coated with the coating composition including metal articles such as aluminum, copper, and steel substrates, as well as wood and glass articles. The articles can be overhead conductors, power and energy equipment, aerospace equipment, automotive equipment, heat pumps, refrigerators, telecommunication equipment, construction equipment, concrete or substrate applications, radar applications, or maritime equipment. Reduced ice adherence and ice accumulation can also be provided to the substrates when a film forming lubricant is included in the coating composition.

In certain embodiments, coatings formed from the coating compositions can be coated on an overhead conductor. As can be appreciated, the coating compositions can be applied to overhead conductors in a variety of configurations including aluminum conductor steel reinforced ("ACSR") cables, aluminum conductor steel supported ("ACSS") cables, aluminum conductor composite core ("ACCC") cables, all aluminum alloy conductor ("AAAC") cables, and composite cables. As can be appreciated, the wires in conductors can have a variety of cross sectional shapes including round and trapezoidal shapes. In certain embodiments, improved ice adherence values can be achieved when the wires are trapezoidal. Examples of composite core cable designs are disclosed in U.S. Pat. Nos. 7,015,395, 7,438,971, and 7,752,754, each of which are incorporated herein by reference.

As can be appreciated, a coating composition can be applied to only certain individual wires of an overhead conductor in certain embodiments. For example, all of the wires of an overhead conductor can be coated in certain embodiments, or only selective wires can be coated. As can be appreciated, it can be advantageous in terms of time, material, or the like to coat only the outer-most wires of a conductor. Alternatively, the coating can be applied only to the outer surface of a bare overhead conductor. In one embodiment, the complete outer surface of a bare conductor can be coated, or in other embodiments only a portion of the bare conductor can be coated.

In certain embodiments, an article can optionally be prepared prior to the application of the coating composition. Suitable preparation processes can include chemical treatment, pressurized air cleaning, hot water or steam cleaning, brush cleaning, heat treatment, sand blasting, ultrasound, deglaring, solvent wipe, plasma treatment, corona treatment, and the like. In certain embodied process, the substrate can also, or alternatively, be deglared by sand blasting. As can be appreciated, preparation processes can be performed in-line or as a separate step. In certain embodiments however, the step of preparing a substrate is unnecessary due to the use of a silicate binder which can suitable adhere even to unprepared substrates.

A coating composition can be applied by a spray gun in certain embodiments. The spray gun can apply the coating composition using a pressure of about 10 psi to about 45 psi. In such embodiments, the spray gun nozzle can be placed perpendicular (e.g., at about 90°) to the longitudinal direction of the substrate to achieve a uniform coating on the substrate. In certain embodiments, two or more spray guns can be used to obtain more efficient, or uniform, coatings. The coating thickness and density can be controlled by the admixture viscosity, gun pressure, and conductor line speed. During the coating application, the substrate temperature can optionally be maintained between 10° C. to 90° C. depending on the material.

Alternatively, a coating composition can be applied to an article by one or more of dipping, a brush, or a roller. In embodiments dipping a substrate, a cleaned and dried article can be dipped into the coating composition to allow the composition to completely coat the article. The article can then be removed from the coating composition and allowed to dry.

After application of the coating composition onto the article, the coating on the article can be dried and cured.

In certain embodiments, the coating can be dried with elevated temperatures. In such embodiments, an oven can be heated up to about 250° C., or in certain embodiments, from about 80° C. to about 150° C. Heat can alternatively be applied through hot air heating, induction heating, or direct flame exposure. Under such elevated temperature conditions, a coating composition can be dried in about 2 minutes or less in certain embodiments, in about 1 minute or less in certain embodiments, in about 30 seconds to about 40 seconds in certain embodiments, in about 1 second to about 30 seconds in certain embodiments, or in about 1 second to about 10 seconds in certain embodiments. In certain embodiments, the step of drying and curing the coating composition can be followed by additional post-curing processes.

Alternatively, in certain embodiments, the coating composition can be dried under ambient conditions. Under ambient conditions, a coating composition can be considered "touch to dry" in about 8 hours or less in certain embodiments, in about 4 hours or less in certain embodiments, and in about 2 hours or less in certain embodiments.

As can be appreciated, the process of drying and curing can take place in a continuous or batch manner. When the drying and curing process is run continuously, a substrate can exit the coating step and continuously enter an air knife and curing process. Alternatively, in a batch manner process, the curing step can be performed on individual sections of the article using, for example, a flaming process. As an illustrative example of a batch process for an overhead cable, after initial drying and partial curing, the coated cable can be wound on to a bobbin, which can subsequently be transferred to a curing process such as an oven. In continuous production, a conductor can instead be wound on a bobbin after continually transferring through a heated oven heated to about 50° C. to about 250° C., in certain embodiments at about 80° C. to about 150° C., for about 0.1 hour to about 24 hours in certain embodiments, and from about 1 minute to about 2 minutes in certain embodiments. Such coating processes can alternatively be run under ambient conditions.

As can be appreciated, the coating composition can also be used with overhead conductors which are already installed and are currently in use including previously strung overhead conductors. Existing conductors can, in certain examples, be coated using a robotic system for automated or semi-automated coating. The automated system functions in three steps including the steps of (1) cleaning the conductor surface; (2) applying a coating on the conductor surface; and (3) drying the coating. As can be appreciated, certain steps, such as the steps of cleaning and drying, can be optional.

As can be further appreciated a coating composition can also be used with overhead transmission line accessories including, for example, transformers, insulators, dead-ends/termination products, splices/joints, products, suspension and support products, motion control/vibration products "dampers," guying products, wildlife protection and deterrent products, conductor and compression fitting repair parts, substation products, clamps and other transmission and distribution accessories. Such products can be commercially obtained from a variety of manufacturers including Preformed Line Products (PLP) of Cleveland, Ohio and AFL of Duncan, S.C. In such embodiments, the coating can be applied at a factory where the accessories are produced or stored, or on-site prior to installation. In other embodiments, the coatings can be applied to previously installed accessories.

EXAMPLES

Table 1 depicts the component dry weight percentages of several Example coating compositions. For each of the Examples, zinc oxide was commercially obtained from U.S. Zinc Inc. (Houston, Tex.) as Azo 66; calcined kaolin was commercially obtained from KaMin LLC (Macon, Ga.) as Polyfil® 90; the zinc molybdate/magnesium silicate complex was commercially obtained from the J.M. Huber Corp. (Atlanta, Ga.) as Kemgard® 911C; the ethylene acrylic acid dispersion was commercially obtained from Michelman (Cincinnati, Ohio) as Mechem® 2960; the silane adhesion promoter was commercially obtained from Evonik (Essen, Germany) as Dynasylan® 6598; the polysiloxane resin modifier was commercially obtained from Momentive Performance Materials Inc. (Strongsville, Ohio) as CoatOSil™ FLX coating modifier; the silane oligomer was commercially obtained from Momentive Performance Materials Inc. as CoatOSil™ MP 200; and the silicone lubricant was commercially obtained from Momentive Performance Materials Inc. as Y-19231. The ethylene acrylic acid dispersion and silane adhesion are coating modifiers. The silicone PDMS oil is a polydimethylsiloxane lubricant which does not exhibit film forming characteristics.

TABLE 1

| Component | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Potassium silicate | 39.4 | 34.9 | 31.5 | 31.2 | 34.8 | 32.9 | 32.9 | 31.2 | 33.8 | 32.9 | 31.2 |
| Zinc oxide | 52.5 | 46.5 | 42.0 | 41.6 | 46.4 | 43.9 | 43.9 | 41.6 | 45.1 | 43.9 | 41.6 |
| Calcined kaolin | 6.6 | 5.8 | 5.3 | 5.2 | 5.8 | 5.5 | 5.5 | 5.2 | 5.6 | 5.5 | 5.2 |
| Zinc molybdate/magnesium silicate complex | 0.0 | 11.6 | 10.5 | 10.4 | 11.6 | 11.0 | 11.0 | 10.4 | 11.3 | 11.0 | 10.4 |
| Ethylene acrylic acid dispersion | 0.3 | 0.0 | 0.2 | 0.2 | 0.2 | 0.2 | 0.2 | 0.2 | 0.2 | 0.2 | 0.2 |
| Silane adhesion promoter | 1.3 | 1.2 | 10.5 | 1.0 | 1.2 | 1.1 | 1.1 | 1.0 | 1.1 | 1.1 | 1.0 |
| Polysiloxane resin modifier | — | — | — | — | — | 5.5 | — | — | — | — | — |
| Silane oligomer | — | — | — | — | — | — | 5.5 | 10.4 | — | — | — |
| Silicone lubricant | — | — | — | — | — | — | — | — | 2.8 | 5.5 | 10.4 |
| Silicone PDMS oil | — | — | — | 10.4 | — | — | — | — | — | — | — |

Examples 5 to 11 are considered Inventive Examples because each exhibits favorable properties as depicted in Table 2. Example 5 illustrates the effect of the film forming lubricants. Specifically, Example 5 exhibits excellent mechanical properties but does not substantially reduce ice adherence because it does not include any film forming lubricants.

TABLE 2

| Property | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| 0.5 Inch Mandrel Bend Test | Fail | Fail | Fail | Fail | Pass | Pass | Pass | Pass | Pass | Pass | Pass |
| 0.5 Inch Mandrel Bend Test after heat aging for 7 days at 200° C. | Fail | Fail | Fail | Fail | Pass | Pass | Pass | Pass | Pass | Pass | Pass |
| 0.5 Inch Mandrel Bend Test after heat aging for 7 days at 90° C. | Fail | Fail | Fail | Fail | Pass | Pass | Pass | Pass | Pass | Pass | Pass |
| Ice adherence (kPa) | — | — | — | 221 | 269 | 221 | 203 | 194 | — | — | 168 |
| Heat Aged Ice Adhesion Test | — | — | — | — | — | Pass | Pass | Pass | — | — | Pass |

As used herein, all percentages (%) are percent by dry weight of the total composition, also expressed as weight/weight %, % (w/w), w/w, w/w % or simply %, unless otherwise indicated. Also, as used herein, the terms "wet" refers to relative percentages of the coating composition in a dispersion medium (e.g. water); and "dry" refers to the relative percentages of the dry coating composition prior to the addition of the dispersion medium. In other words, the dry percentages are those present without taking the dispersion medium into account. Wet admixture refers to the coating composition with the dispersion medium added. "Wet weight percentage", or the like, is the weight in a wet mixture; and "dry weight percentage", or the like, is the weight percentage in a dry composition without the dispersion medium. Unless otherwise indicated, percentages (%) used herein are dry weight percentages based on the weight of the total composition.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. An overhead conductor comprising a bare conductor substantially coated with a coating formed from a coating composition comprising:
    a silicate binder;
    a filler;
    a coating modifier comprising one or more of a dispersion agent and an adhesion promoter; and
    a crosslinking agent comprising a multi-metal complex, wherein the multi-metal complex comprises one or more of a calcium zinc molybdate complex, a zinc molybdate and magnesium silicate complex, a zinc phosphate and metal silicate complex, a zinc phosphate and zinc oxide complex, and a zinc molybdate and magnesium hydroxide complex.

2. The overhead conductor of claim 1 passes one or more of a 0.5 inch Mandrel Bend Test before heat aging and after heat aging at 200° C. for 7 days.

3. The overhead conductor of claim 1 operates about 5° C. or cooler when tested in accordance to ANSI C119.4-2004 than the bare conductor.

4. The overhead conductor of claim 1, wherein the silicate binder comprises an alkali metal silicate comprising one or more of potassium silicate, sodium silicate, lithium silicate, and calcium silicate.

5. The overhead conductor of claim 1, wherein the filler comprises one or more of zinc oxide, gallium oxide, cerium oxide, zirconium oxide, silicon hexaboride, carbon tetraboride, silicon tetraboride, silicon carbide, molybdenum disilicide, tungsten disilicide, zirconium diboride, cupric chromite, magnesium oxide, silicon dioxide, chromium oxides, iron oxide, boron carbide, boron silicide, copper chromium oxide, titanium dioxide, aluminum nitride, boron nitride, and alumina.

6. The overhead conductor of claim 1, wherein the adhesion promoters comprise one or more of an ethylene acrylic acid dispersion and a silane adhesion promoter; and
    wherein the dispersion agent comprises one or more of an ethoxy silane; a methoxy silane, a hydroxy silane, an epoxy silane, and an amino silane.

7. The overhead conductor of claim 1, wherein the coating composition further comprises water.

8. The overhead conductor of claim 1, wherein the coating composition comprises:
    about 25% to about 45%, by dry weight, of the silicate binder;
    about 50% to about 70%, by dry weight, of the filler;
    about 0.1% to about 10%, by dry weight, of the coating modifier;
    about 8% to about 22%, by dry weight, of the crosslinking agent; and
    about 10% or less organic components.

9. The overhead conductor of claim 1, wherein the coating composition further comprises a film forming lubricant.

10. An overhead conductor comprising a bare conductor substantially surrounded with a coating formed from a coating composition comprising:
    a silicate binder;
    a filler;
    a crosslinking agent comprising a multi-metal complex, wherein the multi-metal complex comprises one or more of a calcium zinc molybdate complex, a zinc molybdate and magnesium silicate complex, a zinc phosphate and metal silicate complex, a zinc phosphate and zinc oxide complex, and a zinc molybdate and magnesium hydroxide complex; and
    a film forming lubricant.

11. The overhead conductor of claim 10, wherein ice adheres with about 180 kPa or less of force according to the Ice Adherence Test.

12. The overhead conductor of claim 10 exhibits a water contact angle of about 50° to about 140°.

13. The overhead conductor of claim 10 passes one or more of a 0.5 inch Mandrel Bend Test before heat aging and after heat aging at 200° C. for 7 days.

14. The overhead conductor of claim 10, exhibits one or more of:
    an increase in ice adherence strength after water aging at about 90° C. for 7 days of about 50% or less compared to the ice adherence strength of an unaged coated overhead conductor; and
    an increase in ice adherence strength after heat aging at about 200° C. for 30 days of about 50% or less compared to the ice adherence strength of an unaged coated overhead conductor.

15. The overhead conductor of claim 10, wherein the film forming lubricant comprises one or more of cyclosilicone, a polysiloxane resin modifier, a silane oligomer, and a silicone lubricant.

16. The overhead conductor of claim 10, wherein the coating composition further comprises a coating modifier comprising one or more of a dispersion agent and an adhesion promoter.

17. The overhead conductor of claim 10, wherein the coating composition comprises about 2% to about 12%, by dry weight, of the film forming lubricant.

* * * * *